United States Patent
Candy

(10) Patent No.: US 7,791,345 B2
(45) Date of Patent: Sep. 7, 2010

(54) RECTANGULAR-WAVE TRANSMITTING METAL DETECTOR

(75) Inventor: Bruce Halcro Candy, Basket Range (AU)

(73) Assignee: Minelab Electronics Pty Limited, Torrensville (AU)

( * ) Notice: Subject to any disclaimer, the term of this patent is extended or adjusted under 35 U.S.C. 154(b) by 0 days.

(21) Appl. No.: 12/621,338

(22) Filed: Nov. 18, 2009

(65) Prior Publication Data
US 2010/0148781 A1   Jun. 17, 2010

Related U.S. Application Data

(63) Continuation of application No. PCT/AU2009/000809, filed on Jun. 24, 2009.

(30) Foreign Application Priority Data
Jun. 27, 2008   (AU) .............................. 2008903279

(51) Int. Cl.
*G01V 3/10* (2006.01)

(52) U.S. Cl. ...................................... 324/329; 324/326

(58) Field of Classification Search ....................... None
See application file for complete search history.

(56) References Cited

U.S. PATENT DOCUMENTS

| | | | |
|---|---|---|---|
| 4,942,360 A | 7/1990 | Candy | |
| 5,537,041 A | 7/1996 | Candy | |
| 5,576,624 A | 11/1996 | Candy | |
| 6,636,044 B2 * | 10/2003 | Candy | ........................ 324/329 |
| 7,474,102 B2 | 1/2009 | Candy | |

FOREIGN PATENT DOCUMENTS

| | | |
|---|---|---|
| AU | 2006903737 | 7/2006 |
| AU | 2007906175 | 11/2007 |
| WO | WO 2005/047932 | 5/2005 |

* cited by examiner

*Primary Examiner*—Jay M Patidar
(74) *Attorney, Agent, or Firm*—Beyer Law Group LLP

(57) ABSTRACT

A metal detector including transmit electronics having a plurality of switches for generating a repeating transmit signal cycle for transmission by a transmit coil. The repeating transmit signal cycle includes at least a high voltage period, and at least a low voltage period, the low voltage period followed by a substantially zero voltage period. The output impedance of the transmit electronics is less than three times the equivalent series resistance of the transmit coil during the low voltage period and the substantially zero voltage period.

13 Claims, 3 Drawing Sheets

RECTANGULAR-WAVE TRANSMITTING METAL DETECTOR

CROSS REFERENCE TO RELATED APPLICATIONS

This application is a continuation of International Application No.: PCT/AU2009/000809, filed on Jun. 24, 2009, which is incorporated herein by reference for all purposes.

TECHNICAL FIELD

The present application relates to metal detectors.

INCORPORATION BY REFERENCE

The following documents are referred to in the present specification: U.S. Pat. No. 4,942,360 entitled 'A method and apparatus of discrimination detection using multiple frequencies to determine a recognizable profile of an undesirable substance'; U.S. Pat. No. 5,537,041 entitled 'Discriminating time domain conducting metal detector utilizing multi-period rectangular transmitted pulses'; U.S. Pat. No. 5,576,624 entitled 'Pulse induction time domain metal detector'; U.S. patent application Ser. No. 11/888,641 entitled 'Rectangular-wave transmitting metal detector'; Australian Provisional Patent Application No. 2006903737 entitled 'Metal detector having constant reactive transmit voltage applied to a transmit coil'; Australian Provisional Patent Application No. 2007906175 entitled 'Metal detector with improved magnetic response application'; International Patent Publication No. WO 2005/047932 entitle 'Multi-frequency metal detector having constant reactive transmit voltage applied to a transmit coil'. The entire content of each of these documents is hereby incorporated by reference.

BACKGROUND ART

Most commercial metal detectors are designed for hunting buried metal targets such as gold, coins, treasure and archaeological artifacts. Most of these have transmit electronics arranged to generate a repeating transmit signal cycle, whose output is connected to a transmit coil for the transmission of alternating magnetic fields. Most include a magnetic field receiving means such as a receive coil which is connected to receive electronics which includes signal processing and assessment electronics to give an indicator output. The signal processing and assessment electronics usually includes a preamplifier which output is connected to synchronous demodulators which synchronous demodulation multiplication functions are synchronised to the transmit signal. The outputs of the synchronous demodulators are connected to low-pass filters or "demodulation filters". The low-pass filter outputs are further processed for target identification and indication. The demodulation, low-pass filtering, and further processing may be implemented in analogue and/or digital (DSP).

The principal mode of operation of coin and treasure detectors is "discrimination" mode where ferrous targets are usually discriminated against, but non-ferrous targets within certain time constant ranges are not discriminated against and indicated usually by an audio signal with an accompanying visually displayed time constant. In order to improve the time constant assessment, some metal detectors simultaneously transmit and receive several frequencies, most in the form of multi-period pulse transmission. However, pulse induction (e.g. U.S. Pat. No. 5,576,624) and multi-frequency sine-waves (e.g. U.S. Pat. No. 4,942,360) will suffice too.

Some commercially available sinusoidal single-frequency transmitting metal detectors have switches which allow a user to select different frequencies. The electronics in such detectors is often relatively expensive. The ability to select different frequencies may be useful, for example, in gold nugget prospecting where the size of gold nuggets may vary from location to location and hence the optimal frequency for detection may also correspondingly vary.

Detectors that operate in the "time-domain" contain switching electronics which switches various voltages from various power sources to the transmit coil for various periods. U.S. Pat. No. 5,537,041 discloses a metal detector which transmits multi-period pulses and operates in the time-domain, as too do some commercially available pulse induction metal detectors. Also see for example U.S. Pat. No. 5,576,624.

SUMMARY OF INVENTION

In a broad aspect of the invention there is provided a metal detector used for detecting a metallic target including: a) transmit electronics having a plurality of switches for generating a repeating transmit signal cycle, the repeating transmit signal cycle including at least a high voltage period, and at least a low voltage period, the low voltage period followed by a substantially zero voltage period, wherein an average voltage during the high voltage period and an average voltage during the low voltage period are opposite in polarity, and an average absolute voltage during the high voltage period is higher than an average absolute voltage during the low voltage period; b) a transmit coil connected to the transmit electronics for receiving the repeating transmit signal cycle and transmitting a magnetic field wherein during the low voltage period and the substantially zero voltage period, an output impedance of the transmit electronics is less than three times the equivalent series resistance of the transmit coil; c) a receive coil for receiving a received magnetic field during at least one low voltage period and providing a received signal induced by the received magnetic field; and d) receive electronics connected to the receive coil for processing during at least one low voltage period the received signal to produce an indicator output signal, the indicator output signal including a characteristic indicative of the presence of a metallic target within the transmit magnetic field.

In one form, the repeating transmit signal cycle includes a high voltage period, followed by a low voltage period, followed by a zero voltage period and followed by another low voltage period.

In one form, the average voltage during the high voltage period is at least negative three times the average voltage during the low voltage period.

In one form, the average absolute voltage during any high voltage period is more than about 20 volts and less than about 400 volts.

In one form, the average absolute voltage during any low voltage period is more than about 2 volts and less than about 20 volts.

In one form, an average absolute transmit coil current during any substantially zero voltage period is less than about one third of an average absolute transmit coil current during any other periods excluding any other substantially zero voltage periods.

In one form, the transmit electronics further having at least a first power source for generating a first voltage and a second power source for generating a second voltage, the first voltage and the second voltage are of opposite polarity, wherein the first voltage is switched across the transmit coil during the high voltage period and the second voltage is switched across the transmit coil during the low voltage period.

In one form, the first power source includes a first capacitor, wherein the capacitor is charged and discharged by a transmit coil current during the repeating transmit signal cycle.

In one form, an average voltage of the first voltage applied to the transmit coil during the high voltage period is held substantially constant for every repeating transmit signal cycle.

In another broad aspect of the invention there is provided a method for detecting a metallic target including the steps of: a) generating a repeating transmit signal cycle using transmit electronics, the repeating transmit signal cycle including at least a high voltage period, and at least a low voltage period, the low voltage period followed by a substantially zero voltage period, wherein an average voltage during the high voltage period and an average voltage during the low voltage period are opposite in polarity, and an average absolute voltage during the high voltage period is higher than an average absolute voltage during the low voltage period; b) transmitting a magnetic field from a transmit coil based on the generated repeating transmit signal cycle, wherein during the low voltage period and the substantially zero voltage period, an output impedance of the transmit electronics is less than three times the equivalent series resistance of the transmit coil; c) receiving a received magnetic field during at least one low voltage period and providing a received signal induced by the received magnetic field; and d) processing the received signal during at least one low voltage period to produce an indicator output signal, the indicator output signal including a signal indicative of the presence of a metallic target within the transmit magnetic field.

A detailed description of one or more embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications, and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The term "average" in the context of this description is to be interpreted broadly as an estimate of the most likely or central value of a set of values as would be generally understood by a person skilled in the art. The average could be estimated in a variety of ways such as using the arithmetic mean, weighted mean, trimmed mean, median etc, as would be apparent to the person skilled in the art. The choice will typically depend upon implementation issues such as the nature of the signal, possible effect of outliers, etc.

The reference to any prior art in this specification is not, and should not be taken as, an acknowledgment or any form of suggestion that such prior art forms part of the common general knowledge of the technical field.

BRIEF DESCRIPTION OF THE DRAWINGS

To assist with the understanding of this invention, reference will now be made to the drawings.

DETAILED DESCRIPTION OF THE INVENTION

Figure 1:
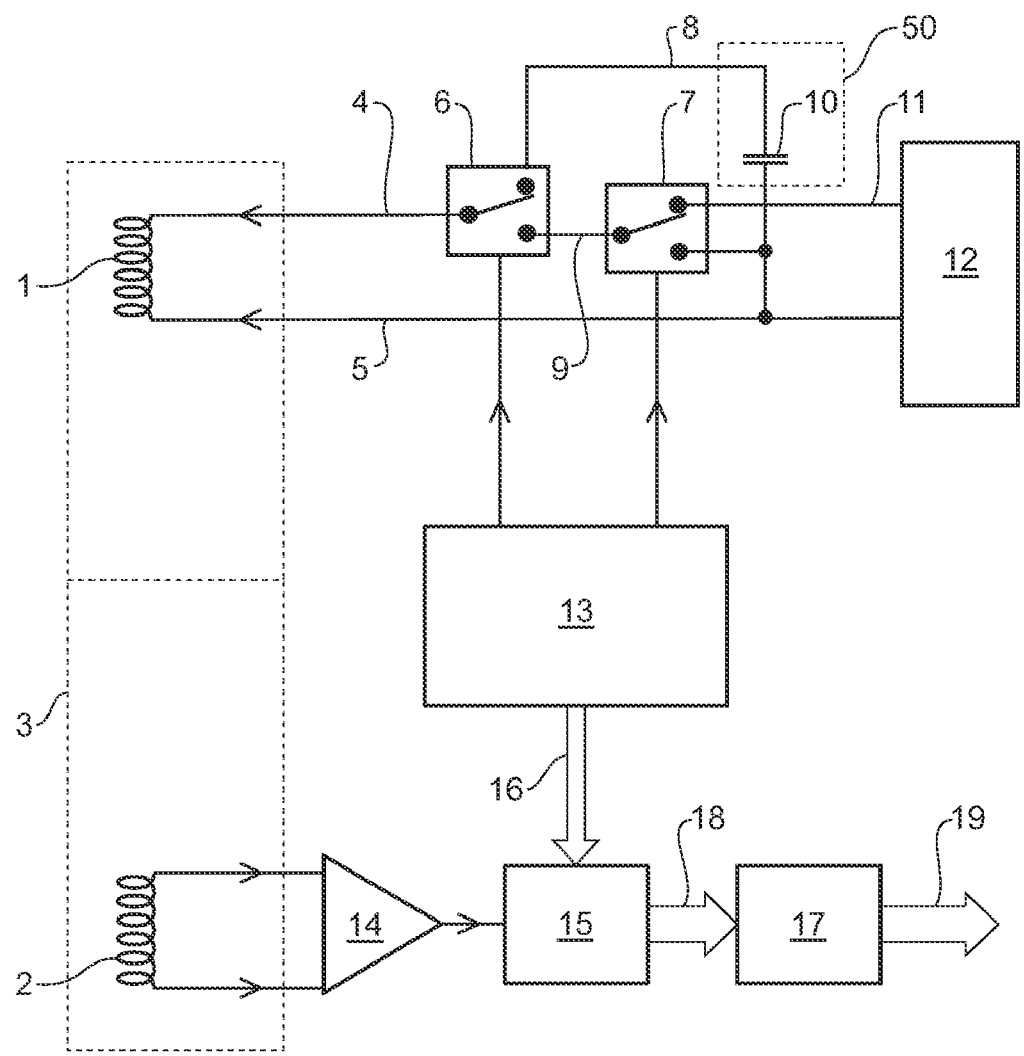
FIG. 1 shows a block electronic circuit diagram of one embodiment.

FIG. 1 shows an example of a one embodiment of an electronic metal detector having transmit electronics (4, 5, 6, 7, 8, 9, 10, 11, 12, 13 and 50), which includes switching electronics consisting of switch 6 and switch 7, both controlled by timing electronics 13. When operational, a repeating transmit signal cycle includes of at least one high voltage period, at least one low voltage period and at least one substantially zero voltage period immediately following the at least one low voltage period appears across output 4 and output 5, which is connected to a transmit coil 1, which transmits a resulting alternating magnetic field. A second power source 12 supplies a low voltage, with a second voltage output at 11 and 5. A first power source 50, in this example, consists of a capacitor 10, a first capacitor, whose energy is provided by a back-emf of the transmit coil 1 switched to capacitor 10 by the said switching electronics, the charge within the storage capacitor being increased and decreased as energy is transferred back and fourth between the capacitor 10 and the transmit coil 1, which results in a high voltage, a first voltage, appearing across capacitor 10, that is, at the first power source 50. When switch 6 selects output 8, that is capacitor 10, the first voltage appears across the transmit coil (which will change slightly as the capacitor is charged and discharged). When switch 6 selects 9, which linked to switch 7, and switch 7 selects output 11, the second voltage appears across the transmit coil. When switch 6 selects switch 7 and switch 7 selects output 5, approximately zero volts appears across the transmit coil (except for a voltage drop owing to transmit coil current flowing through resistive components).

Assuming that the output impedance of the first and the second power source is low, and the "on" resistance of the switches low, then the transmit electronics presents a low output impedance to the transmit coil throughout the repeating transmit signal cycle. Here "low" impedance in particular means that the impedance is less than say three times the equivalent series resistance of the transmit coil during the low voltage period and zero voltage period.

It is not necessary for the first capacitor 10 to be high in value so that during the high voltage period when the first capacitor 10 is switched to the transmit coil 1, the voltage across the first capacitor 10 may change by several percent without causing significant deterioration in performance. For example, suppose the first voltage at 8 is about 180V, the transmit coil 1 inductance say 0.25 mH and the transmit coil current at the commencement of the high voltage period is say 3 A, and the first capacitor 10 say 1 μF, then the voltage across the first capacitor will increase and then decrease by about 6V as the energy from the transmit coil 1 is transferred to and from the first capacitor 10 during the high voltage period. In this context, even though the first voltage may include several percent ripple throughout the repeating transmit signal cycle, it is considered the first voltage is held substantially constant, as the average first voltage applied to the transmit coil during the high voltage period is held substantially constant for every repeating transmit signal cycle.

Further, in order to maintain power efficiency, average voltage drops across the resistive components can be kept low relative to the average transmit coil reactive voltage during the low voltage period and the high voltage period. As the transmit coil reactive voltage is typically considerably higher during the high voltage period (e.g. 180V) and is of very short duration compared to the low voltage period (e.g. 10V), this means that the equivalent series resistance of the transmit electronics during the high voltage period (e.g. 2Ω) may be substantially higher than the equivalent series resistance of the transmit electronics during the low voltage period (e.g. 0.25Ω) whilst maintaining high power efficiency. Hence the "low impedance" of the transmit electronics throughout the repeating transmit signal cycle should be viewed in this context.

Many metal targets have fast decay periods such as small gold nuggets, and fine gold chains. For Pulse Inductor (PI) detectors, it is necessary to commence the receive processing (sampling or synchronous demodulation) following a delay after the back-emf transmit damped decay period to avoid receiving reactive signal components (X) which would otherwise affect ground balance. These delays result in reduced sensitivity to short time constant targets. An advantage of this invention having a low transmit signal output impedance throughout the whole repeating transmit signal cycle, is that this back-emf decay in PI systems is absent, and hence this invention allows for shorter receive processing (sampling or synchronous demodulation) delays after high voltage "back-emf-like" transmit signals, which affords higher sensitivity to fast decay targets compared to PI systems (without X contamination).

Receive electronics (13, 14, 15, 16, 17, 18, 19) is adapted and arranged to receive and process a signal from receive coil 2 which receives a receive magnetic field. Receive coil 2 is connected to preamplifier 14. An output of preamplifier 14 is connected to synchronous demodulators 15 (which may alternatively be samplers) which are controlled by timing electronics 13 via control lines 16. Outputs 18 of the synchronous demodulators 15 are fed to further processing electronics 17 which low-pass filters the outputs 18 and signals at the outputs of these low-pass filters are further processed to produce indicator outputs 19, where the indicator outputs 19 at least indicate the presence of at least some metal targets under the influence of the said alternating magnetic field and indicate at least a characteristic of the said metal targets, such as the ferrous/non-ferrous nature of the said metal targets. The transmit coil 1 and receive coil 2 are usually housed within the same coil housing 3. The various waveforms from timing electronics 13 may be controlled by a user to suit different conditions and likely targets.

Figure 2:
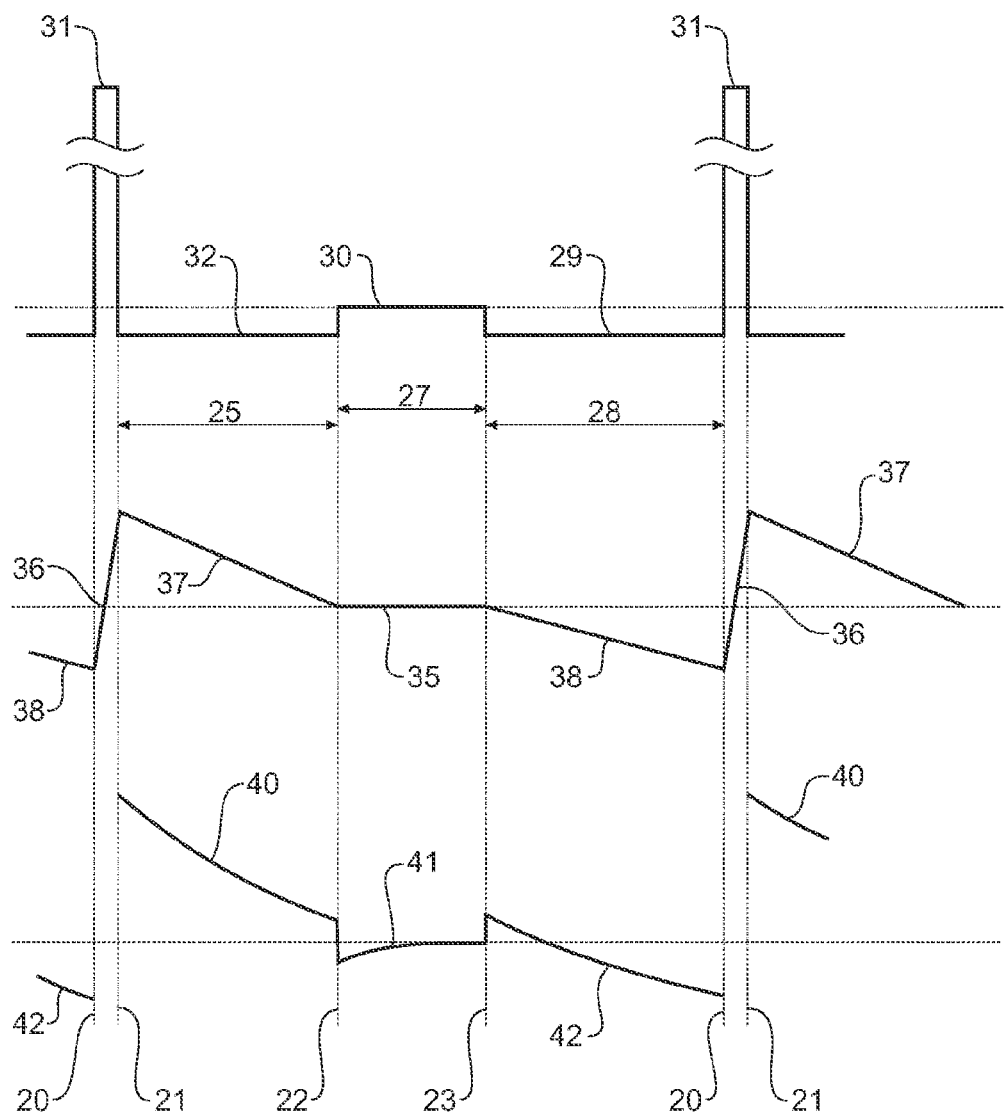
FIG. 2 shows an example of a transmit signal and receive signal waveforms suitable for FIG. 1.

FIG. 2 shows an example of a repeating transmit signal cycle. A high voltage period commences at time 20 and terminates at 21. A low voltage period 25 commences at time 21 and terminates at 22. A substantially zero voltage period 27 commences at time 22 and terminates at 23. Another low voltage period 28 commences at time 23 and terminates at 20. Thereafter the sequence repeats. The voltage of the repeating transmit signal cycle applied across the transmit coil during the high voltage period is the first voltage 31. During both the low voltage periods (periods 25 and 28), the second voltage 29 and 32 are applied, and during the substantially zero voltage period 27, zero voltage 30 is applied. The first voltage waveform during the high voltage period is reduced in scale in FIG. 2 for convenience. The second voltage (shown in FIG. 2 as negative) is opposite in polarity to the first voltage (shown in FIG. 2 as positive), and an absolute magnitude of the first voltage is at least three times an absolute magnitude of the second voltage. In other words, the average voltage during the high voltage period is at least negative three times the average voltage during the low voltage period.

Having a transient high voltage during the repeating transmit signal cycle excites high frequencies, thus causing a rich frequency spectrum, which is conducive to more accurate target discrimination and relatively high sensitivity to, from fast to slow time constant targets.

During the high voltage period the transmit coil current 36 is initially negative and increases positively, passing through zero to a positive peak. This current initially charges capacitor 10 and then discharges capacitor 10. During the low voltage period 25 the transmit coil current 37 is initially at a positive peak value decreases to approximately zero, and then zero voltage is applied across the transmit coil 1 for the substantially zero voltage period 27. The transmit coil current thus remains at approximately zero during this period. Thereafter during the next low voltage period 28 the transmit coil current 38 is initially approximately zero and increases in magnitude negatively to a negative peak value at the end of the period, when the fundamental sequence repeats. The shape of the transmit current waveform is the usual exponential function $I=V/R+(I_0-V/R)e^{-(t/T)}$ where $I_0$ is the initial transmit coil current for each period, where $T=L/R$ is the transmit coil circuit time constant where L is the total effective inductive component and R the total effective series resistive component including the resistance of the electronics, cabling, any connectors and transmit coil, and V is the particular applied emf for each period.

The more useful practical voltages for coin, nugget and land-mine location are when the absolute magnitude of the first voltage is more than about 100V and less than about 400V, but is useful between about 20V and about 400V, and the absolute magnitude of the second voltage and the fourth voltage is more than about 2V and less than about 20V, and the duration of a repeating transmit signal cycle is between about 0.05 ms and 1 ms.

For simplicity of understanding, assume the high voltage period is of negligible duration, the substantially zero voltage period and both low voltage periods are the same duration each and each equal to ⅓ of the duration of a repeating transmit cycle which is equal to a duration of 1, and the transmit coil circuit time $T=L/R$ is effectively infinite. Under these circumstances a first order non-ferrous target of time constant τ during the low voltage period 25 gives a voltage at the receive coil proportional to $$[e^{-2/(3\tau)}-e^{-1/(3\tau)}-2/(3\tau)] e^{-t/\tau}/(1-e^{-1/\tau}), \quad \text{(i)}$$

and during the substantially zero voltage period 27 is proportional to $$[1-e^{-2/(3\tau)}-2/(3\tau)e^{-1/(3\tau)}] e^{-t/\tau}/(1-e^{-1/\tau}), \quad \text{(ii)}$$

and during the next low voltage period 28 is proportional to $$[e^{-1/(3\tau)}-1-2/(3\tau)e^{-2/(3\tau)}] e^{-t/\tau}/(1-e^{-1/\tau}), \quad \text{(iii)}$$

where t=0 at the commencement of each period.

Figure 3:
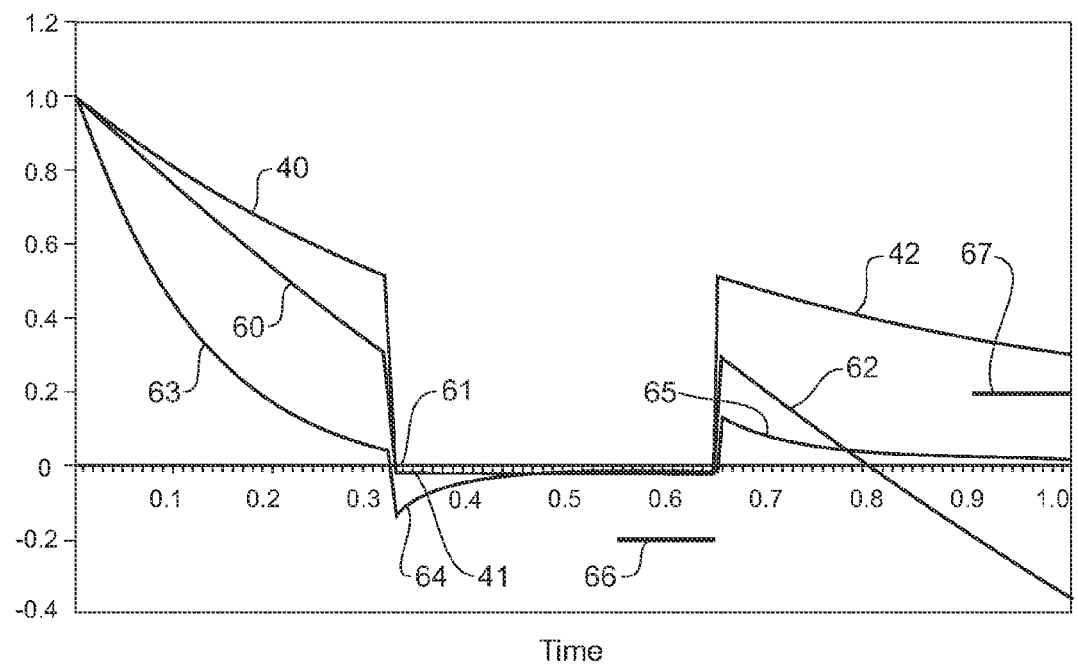
FIG. 3 shows an example of a receive signal for different target time constants in response to the transmit waveform of FIG. 2.

Receive waveform 40, 41 and 42 in FIG. 3 shows a relatively long first order time constant non-ferrous target (relative time-constant=0.5), while receive waveform 63, 64 and

65 shows a relatively shorter first order time constant non-ferrous target (relative time-constant=0.1). Receive waveform 60, 61 and 62 in FIG. 3 shows a receive response to a first order ferrous target. This is basically a "diamagnetic-like" decaying non-ferrous like signal plus a magnetic enhancing reactive component.

Note that the first order terms ($1/\tau$ cancel in (ii) for the substantially zero voltage period 27, thus yielding a weak response when compared with (i) and (iii) for the low voltage periods 25 and 28, especially when compared in the case of long time constant targets. Hence this is a useful period for subtracting a receive signal for magnetic and reactive signal (X) balance, in particular because of the exponentially decreasing reactive transmit signal during the various periods owing to a finite transmit coil circuit time T=L/R.

The eddy current induced voltage component contribution decays during each period, whereas the ferrous magnetic ("X") component of a ferrous metal target is opposite and grows during each period, as the magnetic field enters the target the "diamagnetic-like skin-effect" of the eddy currents decays. As the eddy current induced voltage signal in the receive coil is strongest following the first low voltage period 25, and the eddy current decay induced voltage signal is weakest at the end of the second low voltage period 28, the ferrous magnetic (reactive "X") component is strongest during at the end of the second low voltage period 28. This is shown as a change in sign either during the first low voltage period 25 or the second low voltage period 28, provided the low voltage periods are of long enough duration for the ferrous X component to exceed the "resistive" contribution of the rate of change of the eddy current signal. FIG. 3 shows this as an example of a change in sign during the second low voltage period 28. Thus the ferrous nature, the reactive signal (X) component of a metal target, is most accurately assessed by synchronously demodulating or sampling the receive signal near the end of the second low voltage period 28. This is shown at time intervals 66 and 67, and in general, synchronously demodulating or sampling during the second half of the substantially zero voltage period 27 and second half of the second low voltage period 28 is the most effective.

In order to measure the time constant of a metal target most accurately, the measured components should be free of the relatively large soil magnetic reactive X component, that is the processed resistive ("R") components should be at least approximately "ground balanced" to the soil X component. The differential eddy current induced voltage signal in the receive coil is the resistive "R" contribution. This may be measured by synchronously demodulating a positive contribution during the first low voltage period 25 and subtracting a later synchronously demodulated contribution such that the purely magnetic X is nulled. To achieve this and extract fast time constant R components but attenuate medium and long time constant R components, shortly after the commencement of the first low voltage period 25, a short duration "positive" synchronous demodulation can be added to another short duration "negative" synchronous demodulation following shortly after the "positive" synchronous demodulation. Because of the exponential transmit coil reactive voltage function during the first low voltage period 25 (decreasing reactive voltage), the "negative" integrated synchronous demodulation multiplication factor during the second low voltage period 28 in one form to be larger than the positive contribution so as to ensure "X" ground balance. This can be offset by a compensating "positive" synchronous demodulation during the substantially zero voltage period 27 to maintain balanced synchronous demodulation to avoid low voltage components such as 1/f noise and induced signals from the movement of the receive coil within static magnetic fields.

Similarly, to extract medium time constant components but attenuate short and long time constant components, shortly after the short time constant component synchronous demodulation, or maybe with a bit of overlap, a medium duration "positive" synchronous demodulation can be added to another medium duration "negative" synchronous demodulation following shortly after the medium duration "positive" synchronous demodulation. Again, because of the exponential transmit coil current function during the low voltage periods, synchronous demodulation in one form include balancing contributions from the substantially zero voltage periods to ensure "X" ground balance and balanced synchronous demodulation to suppress low frequencies.

Similarly, to extract long time constant components, the synchronous demodulations in one form is to occur and extend yet later than the medium component periods and in another form these extend up to the termination the second low voltage period 28. Again, the substantially zero voltage period 27 is to provide balanced synchronous demodulation and balanced demodulation.

Ratios of these time constant components will indicate the conductivity of metal targets.

This system offers high power efficiency compared to pulse induction for reasons given in U.S. Ser. No. 11/888,641, and also greater sensitivity to long time constant targets also for reasons given in U.S. Ser. No. 11/888,641. This invention offers a useful alternative to U.S. Ser. No. 11/888,641, and also slightly higher power efficiency owing to just one "back-emf period" for which the switching losses are slightly significant. For power efficiency purposes and the usefulness of having low reactive transmit voltage during the substantially zero voltage period 27 or simple synchronous demodulation balance (receive magnetic balance; see AU2007906175), it is in one form the average absolute transmit coil current during the substantially zero voltage period is less than about one third of the average absolute transmit coil current during the other periods, with zero current during the substantially zero voltage period 27 being simplest and most power efficient.

The electronics may be adapted and arranged so that either the waveform shown in FIG. 2 may be selected by an operator or a different waveform such as for example to include the two alternatives given in U.S. Ser. No. 11/888,641, or the electronics may include several different low negative voltages to which the transmitter may be switched during various periods, e.g. −5V and −18V. For any waveform, the repeating transmit signal cycle may be changed too, for example by equal to or more than a factor of 2 so that the change has clearly noticeably effective.

To compare PI receive signals during the non-transmission period with resistive R signals for the system shown in FIGS. 1 and 2, assume (1) the transmit power consumption (from a transmit coil with a very small finite resistance) is the same for both, (2) both have the same fundamental period, (3) both have the same receive and demodulator gains, (4) the "back-emf" periods (high voltage period) are negligibly short in duration, (5) both have in fact ideal electronics (For example effectively infinite transmit coil circuit time T=L/R).

The PI system applies a negative voltage for half of its repeating transmit signal cycle, followed by a negligibly short back emf period, immediately thereafter during the non-transmission period, the receive signal is demodulated for a quarter of the fundamental period with a gain of +1, and then the receive signal is demodulated for the remaining quarter of the fundamental period with a gain of −1.

In the system shown in FIGS. 1 and 2, the receive signal is demodulated for the first low voltage period 25, the first third of its repeating transmit signal cycle following the high voltage period, with a gain of +1, and the receive signal is demodulated for the second low voltage period 28, the last third of the fundamental period following the substantially zero voltage period 27, with a gain of −1.

With these assumptions, the system shown in FIGS. 1 and 2 will asymptotically yield a signal $64*3^{-1.5}\tau$ times more than the corresponding PI system for long time constant first order non-ferrous targets. Hence demodulating resistive signals during the substantially zero voltage period 27 and both low voltage periods 25 and 28, yields substantially greater sensitivity to long time constant targets than corresponding PI signals during the non-transmission period, and so the sensitivity spectrum is substantially broader than that of PI, which assists in detection depth and discrimination.

WO2005/047932 and provisional patent AU2006904137 disclose advantages in maintaining a transmit coil constant reactive voltage. The waveform described in FIG. 2 with the transmit coil reactive voltage being constant during the substantially zero voltage period 27 and both low voltage periods 25 and 28, would be likewise useful in the detection of gold or landmines in highly mineralised soils. This can be provided by having the transmit electronics adapted and arranged such that the voltage applied to the transmit coil increases in absolute magnitude at least during both low voltage periods 25 and 28.

This invention offers an improved low cost metal detector capable of generating at least stronger high frequency components than existing square-wave or rectangular-wave metal detectors. It also offers an improvement over multi-frequency sine-waves in terms of simplicity, greater insensitivity to ground saline components and better ability to discriminate ferrous targets from non-ferrous.

PI metal detectors have advantage in producing a wideband frequency transmission well suited to the detection of fast time constant targets but have relatively poor intrinsic sensitivity to slow time constant targets compared to most CW systems. Another problem with PI art is poor power efficiency. In this invention a system to transmit waveforms with some PI-like features is disclosed with improvement in power efficiency and in sensitivity to long time constant targets. Further, this invention has the advantage of without the PI transmit signal damped decay which affects sensitivity to short time constant targets. The transmit coil is switched between at least two voltages of opposite polarity, one significantly higher than the other such that the switching electronics is power efficient and energy in the transmit magnetic field is mostly conserved. The transmit waveform also includes at least one period of relatively very low transmit reactive voltage during which period a receive signal component may be used for purposes of receive signal magnetic balancing. Further, the electronics may be relatively simple and low cost.

The invention claimed is:

1. A metal detector used for detecting a metallic target including:
    a) transmit electronics having a plurality of switches for generating a repeating transmit signal cycle, the repeating transmit signal cycle including at least a high voltage period, and at least a low voltage period, the low voltage period followed by a substantially zero voltage period, wherein an average voltage during the high voltage period and an average voltage during the low voltage period are opposite in polarity, and an average absolute voltage during the high voltage period is higher than an average absolute voltage during the low voltage period;
    b) a transmit coil connected to the transmit electronics for receiving the repeating transmit signal cycle and transmitting a magnetic field wherein during the low voltage period and the substantially zero voltage period, an output impedance of the transmit electronics is less than three times the equivalent series resistance of the transmit coil;
    c) a receive coil for receiving a received magnetic field during at least one low voltage period and providing a received signal induced by the received magnetic field; and
    d) receive electronics connected to the receive coil for processing during at least one low voltage period the received signal to produce an indicator output signal, the indicator output signal including a characteristic indicative of the presence of a metallic target within the transmit magnetic field.

2. A metal detector according to claim 1 wherein the repeating transmit signal cycle includes a high voltage period, followed by a low voltage period, followed by a zero voltage period and followed by another low voltage period.

3. A metal detector according to claim 2, wherein the average voltage during the high voltage period is at least negative three times the average voltage during the low voltage period.

4. A metal detector according to claim 2, wherein an average absolute transmit coil current during any substantially zero voltage period is less than about one third of an average absolute transmit coil current during any other periods excluding any other substantially zero voltage periods.

5. A metal detector according to claim 1 or 2, wherein the average voltage during the high voltage period is at least negative three times the average voltage during the low voltage period.

6. A metal detector according to claim 5 wherein the average absolute voltage during any high voltage period is more than about 20 volts and less than about 400 volts.

7. A metal detector according to claim 5 wherein the average absolute voltage during any low voltage period is more than about 2 volts and less than about 20 volts.

8. A metal detector according to claim 1 or 2, wherein an average absolute transmit coil current during any substantially zero voltage period is less than about one third of an average absolute transmit coil current during any other periods excluding any other substantially zero voltage periods.

9. A metal detector according to claim 1 wherein the transmit electronics further having at least a first power source for generating a first voltage and a second power source for generating a second voltage, the first voltage and the second voltage are of opposite polarity, wherein the first voltage is switched across the transmit coil during the high voltage period and the second voltage is switched across the transmit coil during the low voltage period.

10. A metal detector according to claim 9 wherein the first power source includes a first capacitor, wherein the capacitor is charged and discharged by a transmit coil current during the repeating transmit signal cycle.

11. A metal detector according to claim 10, wherein an average voltage of the first voltage applied to the transmit coil during the high voltage period is held substantially constant for every repeating transmit signal cycle.

12. A metal detector according to claim 9 or 10, wherein an average voltage of the first voltage applied to the transmit coil during the high voltage period is held substantially constant for every repeating transmit signal cycle.

13. A method for detecting a metallic target including the steps of:
a) generating a repeating transmit signal cycle using transmit electronics, the repeating transmit signal cycle including at least a high voltage period, and at least a low voltage period, the low voltage period followed by a substantially zero voltage period, wherein an average voltage during the high voltage period and an average voltage during the low voltage period are opposite in polarity, and an average absolute voltage during the high voltage period is higher than an average absolute voltage during the low voltage period;
b) transmitting a magnetic field from a transmit coil based on the generated repeating transmit signal cycle, wherein during the low voltage period and the substantially zero voltage period, an output impedance of the transmit electronics is less than three times the equivalent series resistance of the transmit coil;
c) receiving a received magnetic field during at least one low voltage period and providing a received signal induced by the received magnetic field; and
d) processing the received signal during at least one low voltage period to produce an indicator output signal, the indicator output signal including a signal indicative of the presence of a metallic target within the transmit magnetic field.

* * * * *